Sept. 20, 1971     C. L. PARLETTE     3,605,994
UNIT FRAME ASSEMBLY FOR ENDLESS BELT OR SIMILAR CONVEYOR
Filed March 26, 1970     2 Sheets-Sheet 1
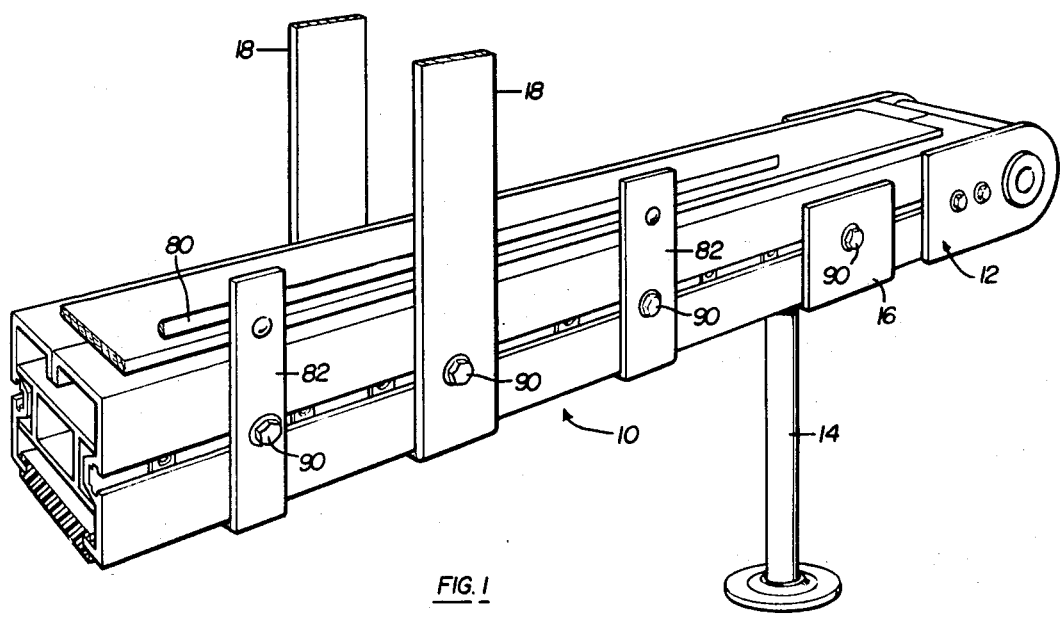
FIG. 1
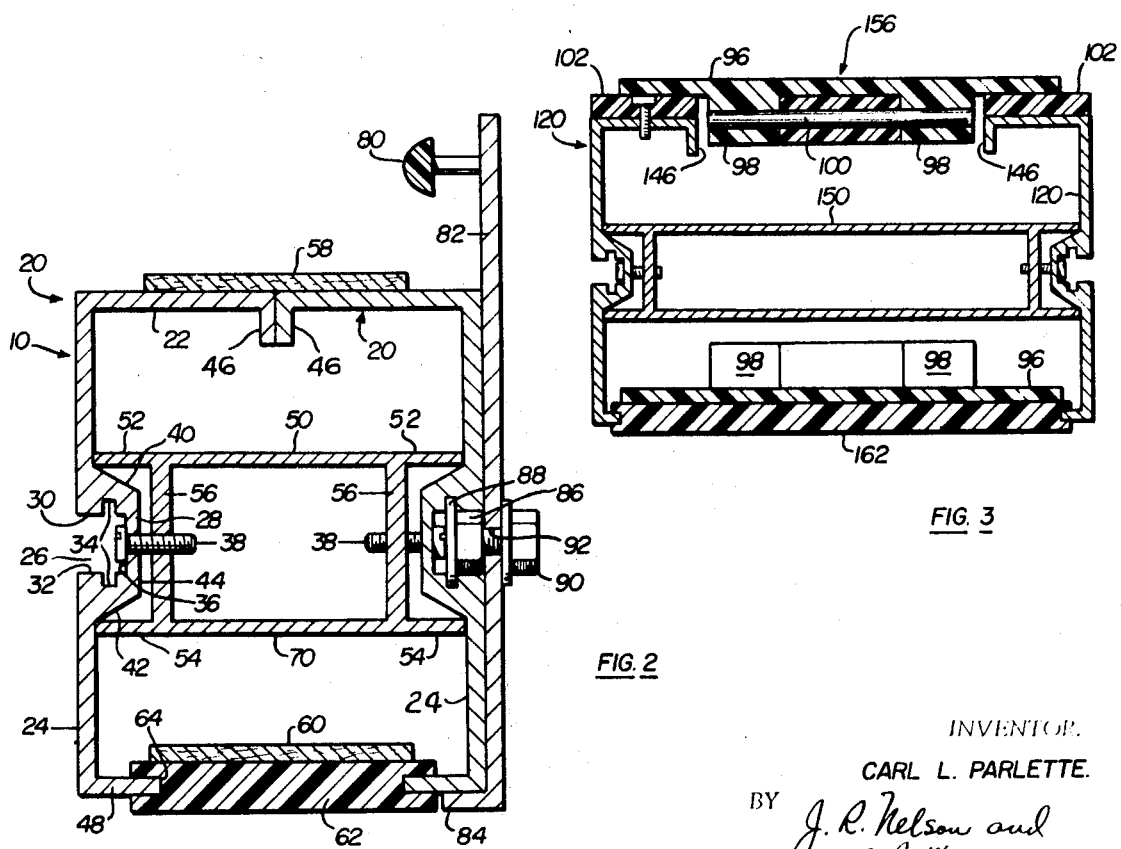
FIG. 2
FIG. 3
INVENTOR.
CARL L. PARLETTE.
BY J. R. Nelson and
E. J. Haller
ATT'YS.

Sept. 20, 1971     C. L. PARLETTE     3,605,994
UNIT FRAME ASSEMBLY FOR ENDLESS BELT OR SIMILAR CONVEYOR
Filed March 26, 1970                       2 Sheets-Sheet 2

INVENTOR.
CARL L. PARLETTE.
BY
J. R. Nelson and
E. J. Haller
ATT'YS.

United States Patent Office 3,605,994
Patented Sept. 20, 1971

3,605,994
UNIT FRAME ASSEMBLY FOR ENDLESS BELT OR SIMILAR CONVEYOR
Carl L. Parlette, Toledo, Ohio, assignor to Owens-Illinois, Inc.
Filed Mar. 26, 1970, Ser. No. 22,861
Int. Cl. B65g 15/60; E04c 3/30; F16b 1/00
U.S. Cl. 198—204                 5 Claims

ABSTRACT OF THE DISCLOSURE

A unit frame assembly is constructed from elongate extruded shapes especially designed to enable simple and rapid fabrication in the field of frames for conveyors of the endless belt, endless chain or plate type.

---

The present invention is especially directed to a flexible and economical system for constructing frames for endless belt or similar type conveyors. Individual frame units of standardized length are assembled from standardized components which may conveniently take the form of extruded aluminum shapes. In accordance with the present invention, a unit frame assembly is fabricated from three major structural components—a hollow box-like coupling member having outwardly projecting upper and lower flanges, and two like frame elements. Each frame element is formed with a flat top web which is integrally joined along its outer longitudinal edge to a side web perpendicular to the top web. A centrally located longitudinally offset portion in the side web defines a longitudinally extending recess in the outer side of the side web and also forms a longitudinal projection on the inner wall of the side web. The width of the projection is matched to the space between the upper and lower flanges on the coupling member so that the two frame elements, when their projections are received between the coupling member flanges, are accurately aligned with each other. Screws pass through the inner wall of the recess and are threaded into the vertical webs of the coupling member to assemble the three elements to each other. Preferably, the frame elements and coupling member are of the same length and the coupling member is assembled in a longitudinally offset relationship to the frame elements so that it projects from one end of the assembly to provide a convenient means for coupling and aligning two unit frame assemblies to each other. The upper and lower walls of the recess are formed with opposed longitudinally extending grooves which can slidably receive the flange of a flange nut with the nut body clearing the heads of the screws which hold the frame elements to the coupling member. The flanged nuts can thus be inserted at one end of the assembly and located anywhere along its length to provide a convenient means for attaching external support members to the unit frame assembly at any desired location along its length.

Other objects and features of the invention will become apparent by reference to the following specification and to the drawings.

In the drawings:

FIG. 1 is a perspective view, partially in section, showing a portion of a conveyor having a unit frame assembly embodying the present invention;

FIG. 2 is a detail cross-sectional view of one form of unit frame assembly embodying the present invention;

FIG. 3 is a transverse cross-sectional view of a modified form of unit frame assembly;

Figure 4:
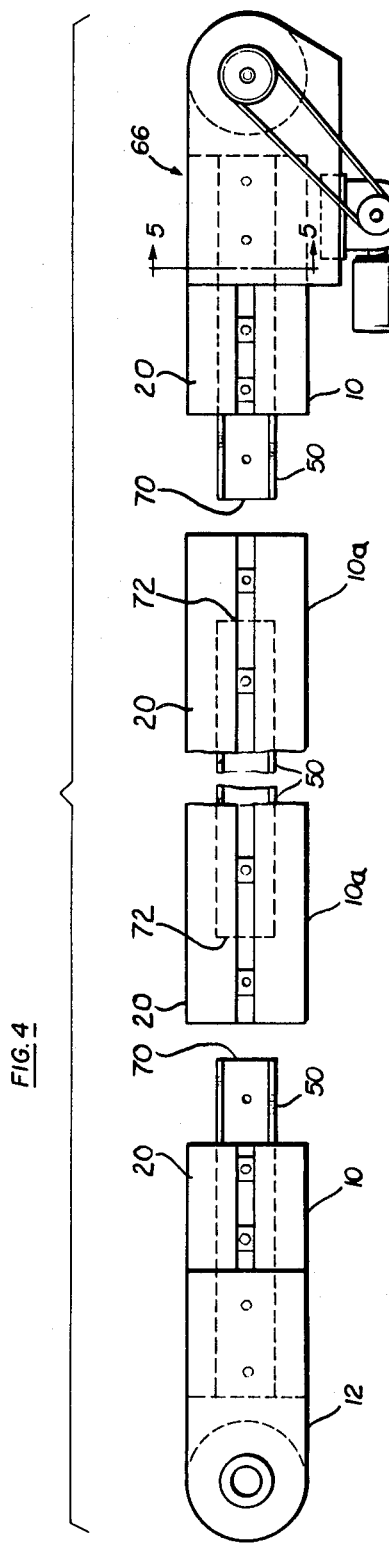
FIG. 4 is an exploded side elevational view, with certain parts broken away, showing a typical installation embodying the present invention.

In FIG. 1, there is shown one end portion of an endless belt conveyor employing a unit frame assembly designated generally 10 embodying the present invention. The particular portion of the conveyor shown illustrates one end of an exemplary conveyor at which an idler end roll assembly 12 is attached to the end of the unit frame assembly 10. Two exemplary forms of supporting the conveyor are illustrated in FIG. 1—namely, a support pedestal 14 having a U-shaped bracket 16 at its upper end which may be bolted to the unit frame 10 and a U-shaped suspension bracket 18 which may be employed when it is desired to suspend the conveyor from overhead.

Details of the unit frame construction are best shown in FIG. 2 which is a transverse cross section of one typical assembly embodying the invention. In this particular form, the unit frame 10 includes two like frame elements designated generally 20. Each of the frame elements 20 is of one-piece construction and includes a top web 22 having a flat upper surface lying in a horizontal general plane and integrally joined along its outer longitudinal edge to a vertically extending side web 24. A centrally located portion of side web 24 is offset inwardly from the general plane of the side web to define a recess 26 in the outer side of side web 24 and to form a projection 28 at the inner side of web 24. The upper and lower walls 30 and 32 of recess 26 are formed with opposed slots 34 which are spaced outwardly from the inner wall 36 of the recess by a distance sufficient so that the head of a screw 38 is located inwardly of the inner wall of slots 34.

The top and bottom walls 40 and 42 of projection 28 are convergently inclined inwardly from side web 24, while the inner side wall 44 of projection 28 is preferably flat.

A downwardly projecting flange 46 is integrally formed with top web 22 and extends along its inner longitudinal edge. An inwardly projecting flange or lip 48 is integrally formed with and extends along the lower longitudinal edge of side web 24.

The two frame elements 20 are held in face-to-face assembled relationship with each other by a box-shaped channel type coupling member 50, which likewise may preferably take the form of an extruded aluminum shape. Coupling member 50 is formed with integral outwardly projecting upper and lower flanges 52 and 54 and vertical webs 56. As shown in FIG. 2, the spacing between upper 52 and lower 54 flanges of coupling member 50 is shown to be equal to the vertical width of projection 28 so that, in assembly, the upper and lower flanges engage the inner side of side web 24 at its point of juncture with the inclined top and bottom walls 40 and 42 of projection 28. The inclination of walls 40 and 42 provides a self seating and aligning engagement between frame elements 20 and coupling member 50. Screws 38 pass through bores in projections 28 and are threaded into self-tapping holes in the vertical webs 56 of coupling member 50 to assemble the two frame elements 20 to coupling member 50.

In the FIG. 2 embodiment, in the assembled position flanges 46 at the inner side of top web 22 are in face-to-face engagement with each other so that the top surfaces of the top webs 22 of the frame elements cooperatively define a flat surface adapted to slidably support the upper run of an endless conveyor belt 58. If desired, the lower run 60 of belt 58 may be slidably supported upon a support plate 62 of nylon or some suitable plastic material having a relatively low coefficient of friction. Plate 62 can be assembled into the unit frame by means of grooves 64 formed and located to receive the inner edges of flanges 48.

Referring now to FIG. 4, there is shown an exploded side view of a typical endless belt conveyor which includes one unit frame assembly 10 of standardized length, a second unit frame assembly 10a which has been cut to the length required by the particular installation, an idler end roll assembly 12 and a drive and drive roll assembly designated generally 66. From FIG. 4, it will be observed that while side frame element 20 and coupling member 50 of a standard unit frame assembly are of the same length, they are assembled in a longitudinally offset relationship to each other so that coupling member 50 projects from one end of the unit frame assembly 10 as at 70. The opposite end 72 of a coupling member 50 is thus located inwardly from the corresponding opposite end of its frame elements 20 so that one or more units 10 may be easily assembled to and aligned with each other in head-to-tail relationship.

Figure 5:
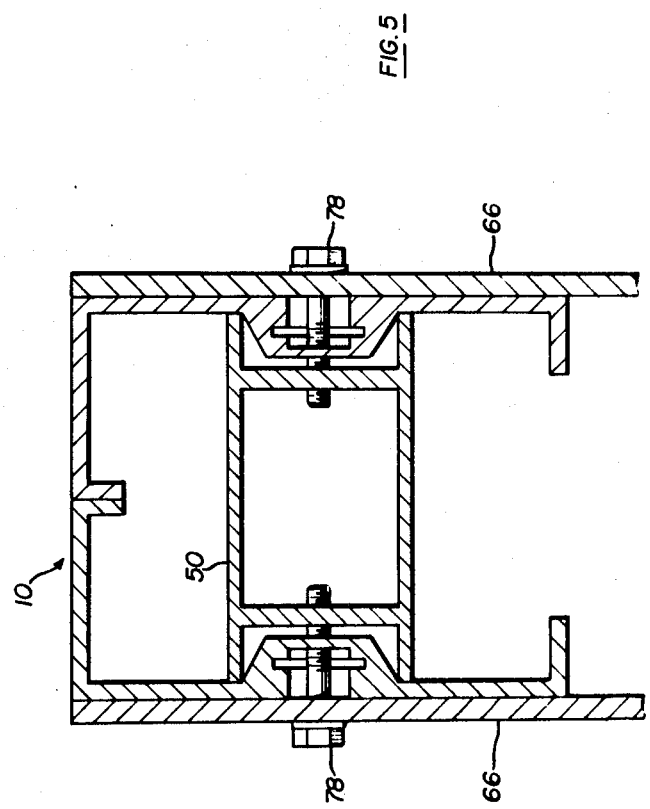
FIG. 5 is a detail transverse cross-sectional view taken on line 5—5 of FIG. 4.

In the usual case, the unit frame assemblies 10 are transported to the place at which the conveyor is to be installed in an unassembled relationship and are assembled at the point of installation. In the usual case, the conveyor which is to be assembled will be of a length which is not an even multiple of the length of a standard unit frame assembly, and the completed conveyor will usually include at least one section such as 10a of FIG. 4 which is cut to length at point of installation. This method of construction, in effect, permits the conveyor to be designed and cut to fit in the field, thus enabling the conveyor to be located or modified on the spot as desired. The drive and idler units 12 and 66 are conveniently attached to the unit frame assemblies as by screws 78 (FIG. 5).

Returning to FIG. 2, it is frequently desired to provide the conveyor with a guide rail 80 to maintain the parts being conveyed on belt 58. Guide rail 80 may conveniently be mounted by means of a plurality of mounting posts or guide rail support members 82 which are constructed from a length of metal strip stock formed with a projecting lip 84 at one end. Support members 82 are assembled onto the unit frame by means of flange nuts 86 whose flange 88 is of a diameter such that it can be slidably received and retained within the groovees 34 of recess 26. As indicated in FIG. 2, grooves 34 are so located that the flange can slide freely along grooves 34 while clearing the heads of screws 38. A bolt 90 passes through a hole 92 in support member 82 to be threadably received within flange nut 86 to clamp support member 82 firmly to the side of unit frame assembly 10. Lip 84 is engaged under the lower edge of side web 24 to maintain support member 82 in a vertical relationship. Flange nuts 86 similarly are employed to attach unit frame assemblies 10 to support structures such as support pedestals 14 or brackets 18 (FIG. 1), and also provide a convenient means for mounting auxiliary structure upon the assembled conveyor.

The embodiment described thus far is directed to one form of endless belt conveyor. The system is readily adaptable to many other forms of conveyors, as for example, a tabletop chain conveyor of FIG. 3, designated generally 156. Conveyors of this type consist of a series of flat platelike support elements 96 having interfitting knuckles 98 at each end to permit a series of plates 96 to be coupled into an endless chain as by coupling pins 100.

For a typical installation of a tabletop chain type conveyor, coupling member 150 will be quite a bit wider than coupling member 50 of the FIG. 2 arrangement. In the assembled relationship, the downwardly projecting flanges 136 of frame elements 120 of the FIG. 3 embodiment are spaced from each other to provide clearance for the knuckles of the conveyor plates. A lower plate support 162 differing primarily in transverse width from the support plate 62 of the FIG. 2 embodiment is employed to support the return run of the tabletop chain. In this particular form of conveyor (FIG. 3) it is usually desirable to provide slide plates 102 to support the conveyor plates 96 of the chain.

Having disclosed two exemplary forms of the invention, I claim:

1. For use as a unit frame assembly for an endless belt or like conveyor; a pair of like elongate one-piece frame elements, each of said elements having a flat horizontally extending top web integrally joined along its outer longitudinal edge to a vertically extending side web, and integral offset section extending longitudinally along said side web defining a recess in and extending the entire length of the outer side of said side web and a projection on the inner side of said side web extending the entire length of said side web, said recess having upper and lower walls extending inwardly from the outer side of said side web and an inner wall, means defining opposed longitudinal grooves in said upper and lower walls at a location spaced outwardly from said inner wall, an elongate coupling member disposed between said frame elements in engagement with the inner sides of said frame elements along opposite sides of the respective projections, and a series of screws passing through the inner walls of the recesses of the frame elements clampingly securing the frame elements to said coupling member in symmetrically disposed facing relationship to each other.

2. The invention defined in claim 1 further comprising a downwardly projecting flange integral with and extending the length of said top web at the inner longitudinal edge thereof, the flanges of said frame elements being clamped together in face-to-face relationship whereby the top surfaces of the top webs of said frame elements cooperatively define a flat surface at the top of the assembly adapted to slidably support a conveyor belt, an inwardly projecting lip integral with and extending the length of said side web at the lower longitudinal edge thereof, and a combination spacer and conveyor belt support element clamped between the lips of said pair of frame elements.

3. The invention defined in claim 1 further comprising a support member, a first threaded member having an integral flange thereon slidably received and retained in said grooves in said recess, and a second threaded member threadably engageable with said first threaded member to clampingly secure said support member against the outer side of said side web.

4. The invention defined in claim 1 wherein said projection is formed with a downwardly and inwardly inclined top wall and an upwardly and inwardly inclined bottom wall, said coupling member having top and bottom flanges spaced vertically from each other to engage the inner side of the side web at the respective junctures of the top and bottom walls of said projection therewith, and an integral vertical web on said coupling member spaced inwardly from said projection when said top and bottom flanges are engaged with said side web, said vertical web having means therein for receiving said screws.

5. The invention in claim 4 wherein said coupling member is longitudinally offset with respect to said frame elements to have one end projecting from one end of the frame elements and its opposite end spaced inwardly of the assembly from the other end of thee frame elements.

References Cited
UNITED STATES PATENTS 3,367,718   2/1968   Hauschopp _____ 198—204X EDWARD A. SROKA, Primary Examiner U.S. Cl. X.R.

52—731; 287—189.36F